US005634119A

United States Patent [19]
Emma et al.

[11] Patent Number: 5,634,119
[45] Date of Patent: May 27, 1997

[54] COMPUTER PROCESSING UNIT EMPLOYING A SEPARATE MILLICODE BRANCH HISTORY TABLE

[75] Inventors: Philip G. Emma, Danbury, Conn.; Joshua W. Knight, III, Mohegan Lake, N.Y.; Thomas R. Puzak, Ridgefield, Conn.; James R. Robinson, Essex Junction, Vt.; A. James Van Norstrand, Jr., Round Rock, Tex.

[73] Assignee: International Business Machines Corporation, Armonk, N.Y.

[21] Appl. No.: 369,441

[22] Filed: Jan. 6, 1995

[51] Int. Cl.$^6$ ............................................. G06F 9/32
[52] U.S. Cl. ........................... 395/587; 395/376; 395/586; 395/595; 395/597
[58] Field of Search .............................. 395/375, 421.03, 395/800, 376, 586, 587, 595, 597

[56] References Cited

U.S. PATENT DOCUMENTS

| | | | |
|---|---|---|---|
| 3,702,007 | 10/1972 | Davis, II | 395/375 |
| 4,338,661 | 7/1982 | Tredennick et al. | 395/375 |
| 4,477,872 | 10/1984 | Losq | 395/375 |
| 4,679,141 | 7/1987 | Pomerene et al. | 395/375 |
| 4,691,277 | 9/1987 | Kronstadt et al. | 395/421.03 |
| 4,763,245 | 8/1988 | Emma et al. | 395/375 |
| 4,901,233 | 2/1990 | Liptay | 395/375 |
| 5,185,869 | 2/1993 | Suzuki | 395/375 |
| 5,226,164 | 7/1993 | Nadas et al. | 395/800 |

*Primary Examiner*—Kenneth S. Kim
*Attorney, Agent, or Firm*—Jay P. Sbrollini

[57] ABSTRACT

A computer processing system includes a first memory that stores instructions belonging to a first instruction set architecture and a second memory that stores instructions belonging to a second instruction set architecture. An instruction buffer is coupled to the first and second memories, for storing instructions that are executed by a processor unit. The system operates in one of two modes. In a first mode, instructions are fetched from the first memory into the instruction buffer according to data stored in a first branch history table. In the second mode, instructions are fetched from the second memory into the instruction buffer according to data stored in a second branch history table.

The first instruction set architecture may be system level instructions and the second instruction set architecture may be millicode instructions that, for example, define a complex system level instruction and/or emulate a third instruction set architecture.

40 Claims, 8 Drawing Sheets

FIG. 4

| 1 | 2 | 3 | 4 | 5 | 6 |
|---|---|---|---|---|---|
| INSTR LOCATION | INSTR | TAKEN BRANCH | BRANCH TARGET ADDRESS | TRAP TO MILLI-CODE | ... | QW INSTR LOCATION |
| ⋮ | | | | | |
| 02DE28 | BAL | ✓ | 02E17A | | 02DE20 |
| 02E17A | BC | | | | 02E170 |
| 17E | LA | | | | " |
| 182 | LTR | | | | 02E180 |
| 184 | BC | ✓ | 02E1DE | | " |
| 02E1DE | TM | | | | 02E1D0 |
| 1E2 | BC | ✓ | 02E208 | | 02E1E0 |
| 02E208 | NI | | | | 02E200 |
| 20C | MVI | | | ✓ | " |
| 210 | LH | | | | 02E210 |
| 214 | N | | | | " |
| 218 | STH | | | | " |
| 21C | L | | | | " |
| 220 | L | | | | 02E220 |
| 224 | MVI | | | | " |
| 228 | TM | | | | " |
| 22C | BC | ✓ | 02E223 | | " |
| 02E234 | LH | | | | 02E230 |
| ⋮ | | | | | |

FIG. 5

| 1 | 2 | 3 | 4 | 5 | |
|---|---|---|---|---|---|
| INSTR LOCATION | INSTR | TAKEN BRANCH | BRANCH TARGET ADDRESS | . . . | QW INSTR LOCATION |
| ⋮ | | | | | |
| 0EED20 | α | ✓ | 0EF17C | | 0EED20 |
| 0EF17C | β | | | | 0EF170 |
| 180 | χ | | | | 0EF180 |
| 182 | υ | | | | " |
| 184 | ω | ✓ | 0EF38C | | " |
| 0EF38C | ƒ | | | | 0EF380 |
| ⋮ | | | | | |

COMPUTER PROCESSING UNIT EMPLOYING A SEPARATE MILLICODE BRANCH HISTORY TABLE

BACKGROUND OF THE INVENTION

1. Technical Field

The invention relates to computer processor units and, more particularly, to controlling the fetching of instructions in computer processing units.

2. Description of the Prior Art

Many of today's computer processing units (CPUs) and microprocessors have a Complex Instruction Set Computer (CISC) Architecture. For example, the architectures of the IBM System 390 and the Intel X86 and Pentium microprocessors are classified as CISC Architectures. The instruction set of a CISC architecture system include both simple instructions (e.g. Load, or Add) and complex instructions (e.g. Edit and Load, Start Interpretive Execution or Diagnose).

Conventionally, the complex functions of the CISC architecture are implemented in microcode because building hardware execution units to execute the complex functions is expensive and error prone. Additionally, implementing complex instructions in microcode provides flexibility to fix problems and expandability in that additional functions can be included later. However, as the number of complex instructions implemented in microcode grows larger and larger, the cycle time of the hardware execution units in executing the microcode instructions and the real estate required for the microcode itself becomes a limiting factor in the performance of the processor/CPU.

To solve this problem, designers have implemented millicode routines that execute such complex functions. As shown in U.S. Pat. No. 5,226,164 to Nadas et al., the millicode routines may be stored in a separate millicode array. The millicode routines may include standard system architecture instructions and/or additional hardware instructions that are added to improve performance. The set of additional hardware instructions stored in the millicode array may be considered to be an alternate architecture that the computer processing unit can operate.

Additionally, the millicode routines may be used to emulate a second instruction set architecture. In this case, the additional hardware instructions stored in the millicode array emulate instructions from a second instruction set architecture.

While the above-described system provides increased flexibility and processing speed, it leaves a number of problems unsolved. One problem relates to the manipulation of millicode branch instructions. In many instances, it may be desirable to predict the outcome of the millicode branch instructions such that the proper instruction (next sequential or target) can be fetched before or at least as soon as it is needed, so that no delay occurs in executing the millicode instruction stream.

An effective strategy for predicting the outcome of branch instructions at the system level is embodied in U.S. Pat. No. 3,559,183 to Sussenguth, which is assigned to the assignee of the present invention. It is based on the observation that most branches, considered individually, are consistently taken or not taken and if taken will have a consistent target address. In this strategy, a table of taken branches is constructed. Each entry in the table consists of the address of the taken branch followed by the target address of the branch. This table is a hardware construct and, thus, has a predetermined size, typically from 1024 to 4096 entries. Entries are made only for taken branches as they are encountered. When the table is full, adding a new entry requires displacing an older entry. This may be accomplished by a Least Recently Used (LRU) algorithm as in caches.

In principle, each branch in the stream of instructions being executed is looked up in the table, by its address, and if it is found, its target is fetched and becomes the next instruction in the stream. If the branch is not in the table, it is presumed not taken. As the execution of the branch instructions proceeds, the table is updated accordingly. If a branch predicted to be taken is not taken, the associated table entry is deleted. If a branch predicted not to be taken is taken, a new entry is made for it. If the predicted target address is wrong, the corrected address is entered.

However, using the system level branch history table for both the system level instructions and the millicode instructions is inefficient and may not improve performance due to a number of factors. One of these factors, for example, is based on the observation that millicode instructions will not be executed very often. Thus, when millicode instructions are encountered, most branch entries created in the system level branch history table for the millicode instructions will have been overwritten. An additional factor is that utilizing the branch history table for millicode branches also displaces system level branch instructions. Thus, in some cases, performance may actually be lost by using the conventional system level branch history table to predict millicode branch outcomes.

SUMMARY OF THE INVENTION

The above-stated problems and related problems of the prior art are solved with the principles of the present invention, computer processor unit employing a millicode branch history table. The computer processing unit of the present invention includes a first memory that stores instructions belonging to a first set of instructions and a second memory that stores instructions belonging to a second set of instructions. An instruction buffer is coupled to the first and second memories, for storing instructions that are executed by a processor unit. The system operates in one of two modes. In a first mode, instructions are fetched from the first memory into the instruction buffer according to data stored in a first table. In the second mode, instructions are fetched from the second memory into the instruction buffer according to data stored in a second table.

The first and second set of instructions typically include at least one branch type instruction. In the illustrative embodiment, the first table is a branch history table associated with the first set of instructions and the second table is a branch history table associated with the second set of instructions. The first set of instructions may be system level instructions and the second set of instructions may be millicode instructions that for example, define a complex system level instruction and/or emulate a second instruction set architecture.

BRIEF DESCRIPTION OF THE DRAWINGS

FIG. 4 is a diagram of a sample system level instruction sequence.

FIG. 5 is a diagram of a sample millicode routine.

DETAILED DESCRIPTION OF THE PREFERRED EMBODIMENTS

Figure 1:
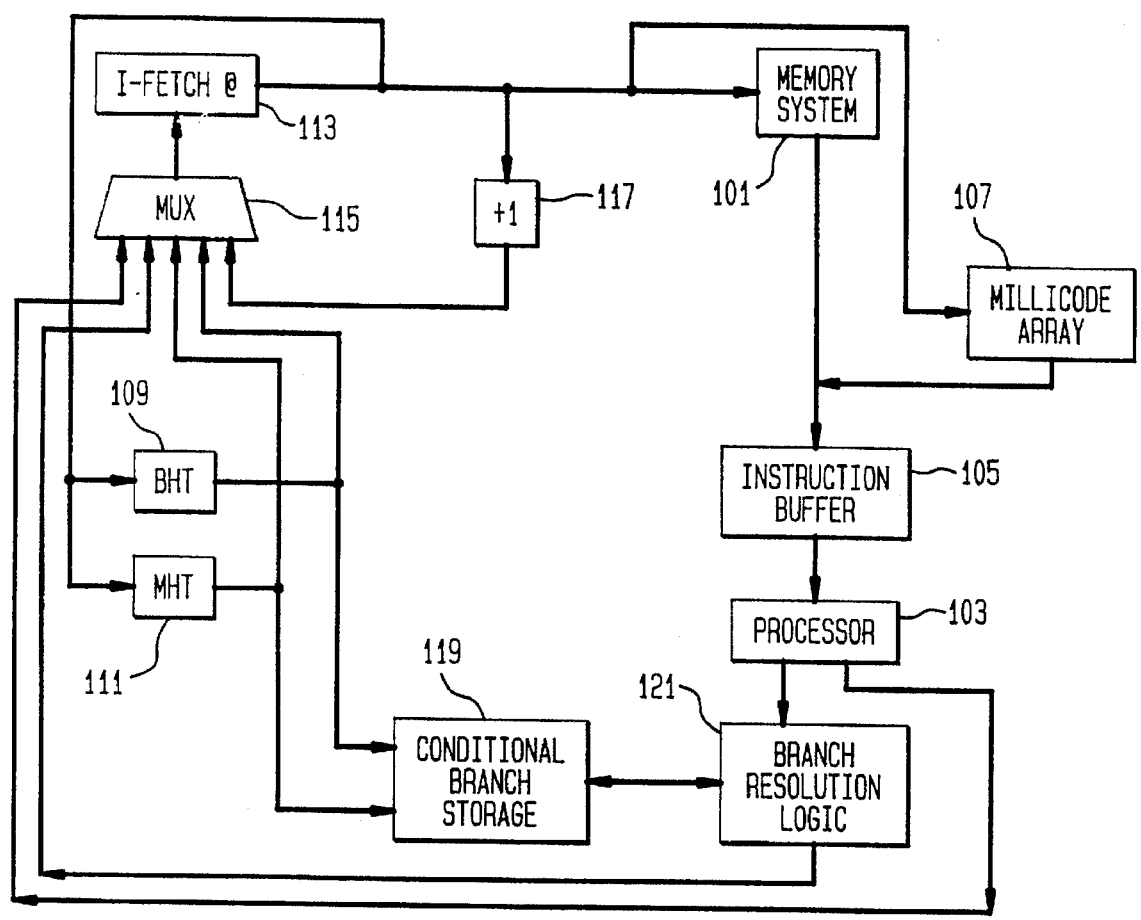
FIG. 1 is a functional block diagram of a computer processing unit according to the present invention.

With reference to FIG. 1, a high performance computer processing unit includes a memory system 101 that stores instructions to be executed by a processor 103 as well as data associated with the instructions executed by the processor 103. As is conventional, the memory system 101 may include a main memory and a cache memory subsystem. The cache memory subsystem may be a conventional combined data/instruction cache type, or in the alternative a split cache.

Figure 2:
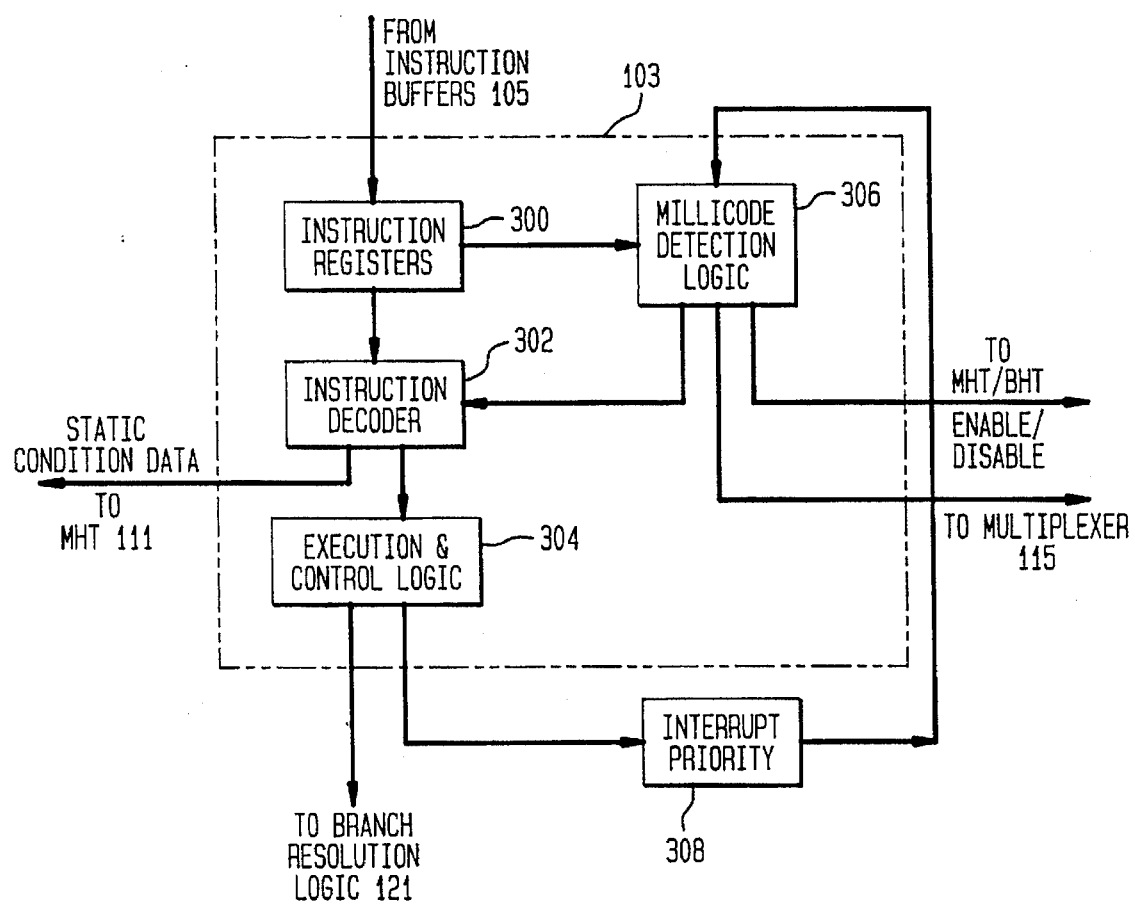
FIG. 2 is a functional block diagram of the processor of FIG. 1.

An instruction buffer 105 is connected to receive instructions from the memory system 101 and from a millicode array 107 (which will be described in more detail later). As shown in FIG. 2, the processor 103 typically includes at least one instruction register 300 that stores instructions loaded from the instruction buffer 105, an instruction decoder 302 that decodes the contents of the instruction register and schedules decoded instructions for execution by execution and control logic 304, which may include one or more hardware execution elements. A more detailed diagram of the conventional elements of the processor 103 can be seen, for example, in U.S. Pat. No. 4,901,233 to Liptay and U.S. Pat. No. 5,226,164 to Nadas et al., both commonly assigned to the assignee of the present invention, and hereinafter incorporated by reference in their entirety.

Figure 3:
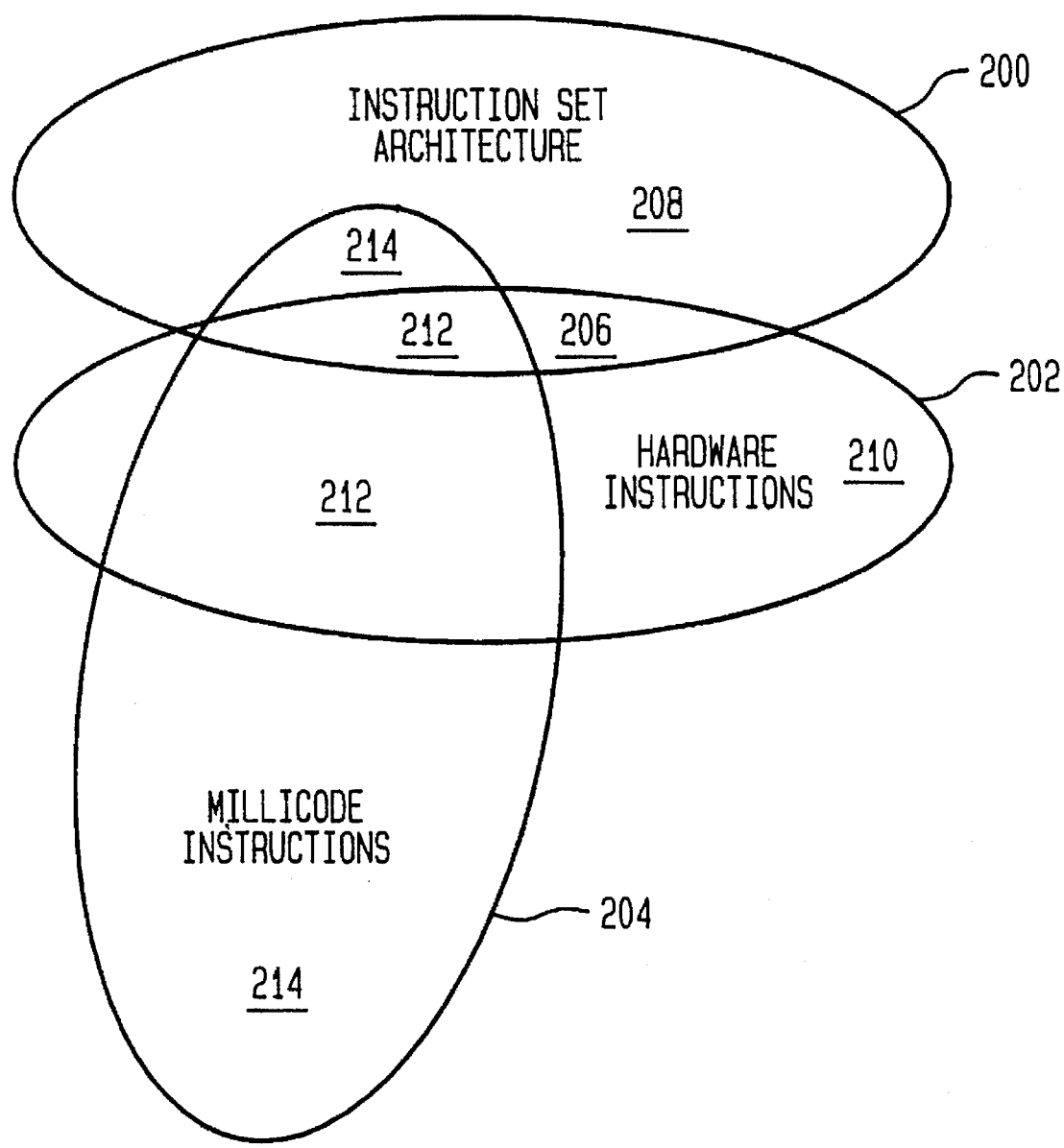
FIG. 3 is a Venn diagram illustrating the instruction set architectures executed by the computer processing unit of FIG. 1.

As shown in FIG. 3, the instructions executed by the processor 103 may be broken down into three groups. A first group 200 represents a system level instruction set architecture visible to the user. A second group 202 represents the instructions executed by the hardware execution unit(s) of the processor 103. A third group 204 represents a set of millicode instructions. Typically, some of the instructions of the first group 200, denoted by the area 206, may be executed directly by the hardware execution unit(s); while other instructions of the first group 200, denoted by area 208, are implemented in microcode routines associated with the hardware execution unit(s), denoted by area 210. Similarly, some of the instructions of the third group 204, denoted by area 212, may be executed directly by the hardware executions unit(s); while other instructions of the third group, denoted by area 214, are implemented in microcode associated with the hardware execution unit, denoted by area 210. Moreover, as shown in FIG. 3, the millicode instructions may and/or may not include instructions that are part of the first group 200. The millicode instructions that are not part of the first group 200 may define complex instructions of the system level instruction set architecture of the first group 200 and/or emulate a second instruction set architecture. The millicode instructions as described above may be grouped together to form millicode routines. The millicode routines are stored in the millicode array 107 and typically reside outside of program addressable storage.

According to the present invention, a branch history table (BHT) 109 and a millicode branch history table (MHT) 111 operate to fetch instructions from the memory system 101 and the millicode array 107 into the instruction buffer 105 in advance of when they are needed such that the instructions are ready for loading into the processor 103 for execution. The BHT 109 operates to control the fetching of instructions from the memory system 101, and the MHT 111 operates to control the fetching of instructions from the millicode array 107. Instructions may be fetched from the memory system 101 and the millicode array 107 individually or in a group commonly called a block. Fetching blocks of instructions is preferable in cache systems because it provides greater cache access for operands. In current practice, a block is typically a quadword (QW-16 bytes), but in future machines the block may be eight words (32 bytes) or more. Moreover, instructions may or may not be aligned on block boundaries.

Under normal operation, the processor 103 executes system level instructions. In this mode, the BHT 109 is enabled and the MHT 111 is disabled. The address that identifies the block of instructions to be fetched from the memory system 101 into the instruction buffer 105 is stored in an I-FETCH address register 113. The block address stored in the I-FETCH address register 113 is supplied to the BHT 109.

Generally, the BHT 109 operates to identify if one or more instructions identified by the supplied block address is a branch instruction that is predicted to be taken. If the BHT 109 determines that the block of instructions does not include a branch instruction, or includes one or more branch instructions that are predicted to be not taken, the BHT 109 controls a multiplexer 115 to load the next sequential block address (generated by next sequential block address generation logic 117) into the I-FETCH address register 113. In this case, in the next fetch operation, the next sequential block is fetched from the memory system 101 into the instruction buffer 105. If the BHT 109 determines that one or more of the instructions is a branch instruction predicted to be taken, the BHT 109 controls the multiplexer 115 to load into the I-FETCH address register 113 the block address of the target instruction of the first (i.e. first in sequence) predicted taken branch instruction. In this case, in the next fetch operation, the block that includes the target instruction of the first predicted taken branch is fetched from the memory system 101 into the instruction buffer 105. The process described above can, in principle, be continued indefinitely, getting farther and farther ahead of the block which the processor is currently executing. Two practical considerations will set a limit: first, the size of the instruction buffer and second, the increasing probability that some branch in the chain of blocks will be incorrectly predicted by the BHT, in which case all further block prefetching beyond the incorrectly predicted branch will be useless.

It is important to realize that their may be more than one branch instruction predicted to be taken within a block. In order for the BHT 109 to identify the first predicted branch instruction, the byte address of the target instruction may be stored in the I-FETCH address register. The byte address is not utilized by the memory system 101 in fetching blocks of instructions, but is supplied to the BHT 109 to indicate the entry point of the target instruction in the block. In this case, the BHT 109 utilizes the byte address of the target to identify the first branch instruction predicted to be taken that occurs in sequence after the supplied entry point. A more detailed description of the operation of a system employing a branch history table may be found in U.S. Pat. No. 4,679,141 to Pomerene et al., commonly assigned to the assignee of the present invention, and hereinafter incorporated by reference in its entirety.

As shown in FIG. 2, to transition between system level instructions and millicode routines, the processor 103 includes millicode detection logic 306 that recognizes when a system level instruction being decoded by the instruction decoder 302 is of the type that is to be interpreted by a millicode routine. When this occurs, the millicode detection logic 306 generates an entry point address into the millicode array 107, disables the BHT 109 and enables the MHT 111, and loads the entry point address into the I-FETCH address register 113 via multiplexer 115.

Another way that the system can transition between system level instructions and millicode routines is in response to an interrupt. In this case, the execution and detection logic 304 includes circuitry that detects an interrupt and that outputs a signal identifying the particular interrupt. Typically, the signal is supplied to interrupt priority logic 308, which generates control inputs which are used by the millicode detection logic 306 to generate an entry point address into the millicode array 107, disable the BHT 109 and enable the MHT 111, and load the entry point address into the I-FETCH address register 113 via multiplexer 115.

To switch back to the normal operation mode, typically the millicode detection logic 306 recognizes a special "return from millicode" (MEND) instruction. In this case, the millicode detection logic 306 generates a starting memory address, disables the MHT 111 and enables the BHT 109, and loads the starting memory address into the I-FETCH address register 113 via multiplexer 115.

A more detailed description of the operation of the processor 103 in switching between system level instructions and millicode routines may be found in U.S. Pat. No. 5,226,164 to Nadas et al., incorporated by reference above.

When operating in millicode mode, the address stored in the I-FETCH address register 113 identifies the block of instructions to be fetched from the millicode array 107 into the instruction buffer 105. Similar to the operation of the BHT 109 described above, the block address stored in the I-FETCH address register 113 is supplied to the MHT 111. Generally, the MHT 111 operates to identify if one or more instructions identified by the supplied block address is a branch instruction that is predicted to be taken. If the MHT 111 determines that the block of instructions does not include a branch instruction, or includes one or more branch instructions that are predicted to be not taken, the MHT 109 controls the multiplexer 115 to load the next sequential block address (generated by next sequential block address generation logic 117) into the I-FETCH address register 113. In this case, in the next fetch operation, the next sequential block is fetched from the millicode array 107 into the instruction buffer 105. If the MHT 111 determines that one or more of the instructions is a branch instruction predicted to be taken, the MHT 111 controls the multiplexer 115 to load into the I-FETCH address register 113 the block address of the target instruction of the first (i.e. first in sequence) predicted taken branch instruction. In this case, in the next fetch operation, the block including the target instruction of the first predicted taken branch is fetched from the millicode array 107 into the instruction buffer 105. The process described above can, in principle, be continued indefinitely, getting farther and farther ahead of the block which the processor is currently executing.

Again, there may be more than one millicode branch instruction predicted to be taken within a block. In order for the MHT 111 to identify the first predicted branch instruction, the byte address of the target instruction may be stored in the I-FETCH address register. The byte address is not utilized by the millicode array 107 in fetching blocks of instructions, but is supplied to the MHT 111 to indicate the entry point of the target instruction in the block. In this case, the MHT 111 utilizes the byte address of the target to identify the first branch instruction predicted to be taken that occurs in sequence after the supplied entry point.

FIG. 4 shows a sample sequence of system level instructions that are stored in the memory system 101. The system level instructions typically include a number of branch instructions and utilize the block format discussed above. Column 1 gives the memory address (in hexadecimal) where each instruction resides. Column 2 gives the instruction mnemonic. For illustrative purposes only, column 3 includes a check mark that indicates whether the associated branch instruction is taken. Column 4 gives the corresponding target address. The target address is the target address of the next instruction to be executed after the taken branch instruction, as can be seen by comparing each entry in column 4 with the entry one line down in column 1. For illustrative purposes only, column 5 includes a check mark that indicates whether the instruction results in a trap to a millicode routine. Finally, column 6 gives the block location of each instruction. As shown, a quadword may be used, for example, as the block size.

FIG. 4 shows that a system level instruction, for example, the instruction MV1 at address 02E224, results in a trap to a millicode routine stored in the millicode array 107. The millicode routines may, for example, define complex system level instructions and/or emulate a second instruction set architecture. FIG. 5 illustrates an example of the trapped to millicode routine. As shown, the millicode routine may include a number of branch instructions and utilize the block format discussed above. Column 1 gives the memory address (in hexadecimal) within the millicode array where each millicode instruction resides. Column 2 gives the instruction mnemonic. For illustrative purposes only, column 3 includes a check mark that indicates whether the associated branch instruction is taken. Column 4 gives the corresponding target address. The target address is the target address of the next millicode instruction to be executed after the taken branch instruction, as can be seen by comparing each entry in column 4 with the entry one line down in column 1. Finally, column 5 gives the block location of each millicode instruction. As shown, a quadword may be used, for example, as the block size.

Figure 6:
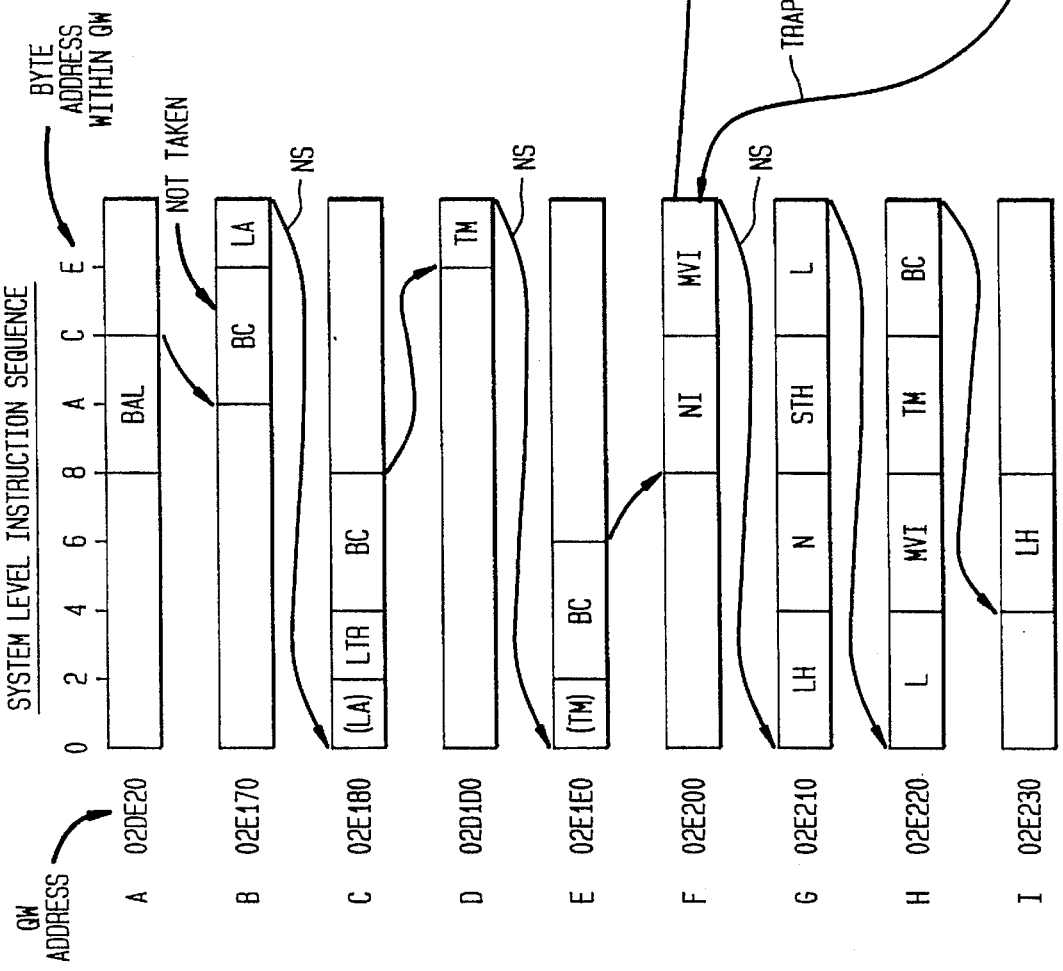
FIG. 6 illustrates the location in memory of the instruction sequences of FIGS. 4 and 5.

FIG. 6 shows the sequence of system level and millicode instructions of FIGS. 4 and 5 properly located within their respective quadword blocks. Note that the transition from one block to another occurs in two ways: a branch transition or a sequential transition. Also note that the transition from the system level instructions to the millicode routine occurs when a millicode trap is detected by millicode detection logic within the processor 103 as described above.

Starting from the top, the first transition is a branch transition caused by a branch (BAL) instruction and the second transition is sequential transition to the next sequential (NS) block. The third transition is a branch transition caused by a branch (BC) instruction and the fourth is a sequential transition to the next sequential block. The fifth transition is a branch transition caused by the branch (BC) instruction. Note that the instructions may not be aligned on block boundaries. In this case, the transition from one block to another may occur because an instruction is located partly in one block and partly in the next block. For example, the LA instruction is located partly in block 02E170 and partly in block 02E180.

When the instruction decoder 302 of the processor 103 is decoding the MV1 instruction, the millicode detection logic 306 recognizes that the MV1 instruction is of the type that is to be interpreted by a millicode routine, generates the entry point address 0EED20 into the millicode array 107 of the associated millicode routine, disables the BHT 109 and enables the MHT 111, and loads the entry point address 0EED20 into the I-FETCH address register 113 via the multiplexer 115. The instruction sequence of the millicode routine of FIG. 5 is then loaded into the instruction buffer 105 for execution by the processor 103.

Like the sequence of system level instructions, the transition from one block to another in the millicode routine occurs in two ways: a branch transition or a sequential transition. Starting from the top of the millicode routine, the first transition is a branch transition caused by a branch ($\alpha$) instruction. The second transition is sequential transition to the next sequential (NS) block. The third transition is a branch transition caused by a branch ($\omega$) instruction. The millicode routine is then completed by the execution of an MEND instruction, denoted by instruction F in FIGS. 4 and 5 and, which switches control back to the flow of system level instructions. Note that the millicode instructions, like the system level instructions, may not be aligned on block boundaries.

As described above, the BHT 109 and MHT 111 generally operate to predict the block sequence of instructions fetched into the instruction buffer 105 from the memory system 101 and millicode array 107, respectively, such that the needed blocks can be fetched in advance, thus avoiding processor delay. With reference to FIGS. 3–5, a sequence of system level instructions stored in the memory system may be started by fetching block A and at the same time accessing the BHT 109 with the (QW) address of block A. Because there is a taken branch in block A, a valid entry in the BHT 109 for Block A exists. This entry contains the location of the branch instruction and the predicted target address of the branch instruction. Because block B contains the predicted target address, block B is fetched and at the same time the BHT 109 is accessed with the address of block B. Because there is not a predicted taken branch in block B, there is no valid entry for block B in the BHT 109. Instead, the BHT 109 returns a "miss" indication that indicates that the next sequential block C should be fetched. Block C is then fetched and at the same time the BHT 109 is accessed with the address of block C. Because there is a predicted taken branch in block C, the BHT 109 will return the target address of the taken branch, which is used to fetch block D, etc.

Similarly, the sequence of millicode instructions is started by fetching block A' from the millicode array and at the same time accessing the MHT 111 with the (QW) address of block A'. Because there is a predicted taken branch in block A', a valid entry in the MHT 111 for Block A' exists. This entry contains the location of the branch instruction and the predicted target address of the branch instruction. Because block B' contains the predicted target address, block B' is fetched and at the same time the MHT 111 is accessed with the address of block B' Because there is not a predicted taken branch in block B', there is no valid entry for block B' in the MHT 111. Instead, the MHT 111 returns a "miss" indication that indicates that the next sequential block C' should be fetched. Block C' is then fetched and at the same time the MHT 111 is accessed with the address of block C'. Because there is a predicted taken branch in block C', the MHT 111 will return the target address of the taken branch, which is used to fetch block D'.

Having provided a general description of the BHT 109 and MHT 111, a specific hardware embodiment of the BHT 109 and MHT 111 as described above is set forth. The operation of the BHT 109 and MHT 111 is very much like a cache except that the block entries of each of the tables are not blocks of instructions, but rather contain information on taken branches which may be found in the blocks of instructions.

With reference to FIG. 6, the MHT 111 includes an input latch 200 that stores the full address X of the accessed instruction. The full address X may be broken down into two parts: a block address BA and an offset OFF that indicates the position of the instruction in the block. The full address X stored in the input latch 200 is compared to an array 202 of entries. Each entry of the array 202 typically includes a bit 204 that indicates if the branch instruction is predicted to be taken/not taken (commonly called a valid bit), a branch address tag 206 that indicates the location of the branch instruction in the block, and a target address 208 of the branch instruction if taken. Typically, the target address 208 is a full instruction address since the target may be in any block. However, if the block size is made large, there may be a good chance the target will be within the same block. In this case, the target address 208 could be abbreviated. Moreover, the array 200 may be arranged in as a fully associative structure, a direct-mapped structure, or preferably a set associative structure. As shown, the array 200 is arranged as a four way set associative structure.

More specifically, the first part BA of the full address X stored in the input latch 200 is supplied to a decoder 210 whose function is to activate the corresponding row of the array 202. Each entry of the activated row (the four entries as shown) is read out of the array 202 into storage elements 212. The entries loaded into the storage elements 212 along with the second part OFF of the full address X stored in the input latch 200 are supplied to hit recognition and selection logic 214. The hit recognition and selection logic 214 determines if the entries loaded into the storage elements 212 have a branch address tag 206 that is greater than the offset OFF of the accessed instruction, and if the valid bit of such an entry indicates the branch is predicted taken. If these two conditions are met, the hit recognition and selection logic outputs a "hit" signal, the block address BA and branch address BR that identifies the full address of the branch instruction that meets the conditions, and the target address TA of the branch instruction. If the two conditions are not met, the hit recognition and selection logic outputs a "miss" signal. The "hit" signal controls the multiplexer 115 to load the target address TA into the I-fetch address register 113. The "miss" signal controls the multiplexer 115 to load the next sequential block address (generated by next sequential block address generation logic 117) into the I-FETCH address register 113. A more detailed description of the control of the "hit" and "miss" signals is described in U.S. Pat. No. 4,679,141 to Pomerene et al., incorporated by reference above.

Note that more than one millicode branch instruction that satisfies the two conditions may occur with a block. In this case, the hit resolution and prediction logic includes additional logic to pick one of the millicode branch instructions, for example, the branch instruction whose branch address tag 206 is nearest to the offset OFF of the accessed instruction.

The structure of the BHT 109 may be identical to that of the MHT 111 as described above.

The BHT 109 and MHT 111 may require correction. For example, the taken/not taken prediction of conditional branch instructions may be wrong, or the target address of these branch instructions may be wrong. In order to provide the capability to correct the BHT 109 and the MHT 111, each time a conditional branch instruction "hit" is encountered, the corresponding block address BA, branch address BR and target address TA are stored in conditional branch storage 119. The need to correct the BHT 109 or MHT 111 will usually be detected at two points in the execution of the associated branch instruction by the processor 103. First, a wrong target address will typically be detected early. Second, a taken/not taken prediction error will typically be detected later because detection depends upon completion of the instruction previous to the branch. These two points may be several cycles after the branch instruction was loaded into the processor, and in the meantime additional branch instructions may have been fetched into the instruction buffer 105 using the BHT 109 or the MHT 111.

Typically, a wrong target address will be detected by the processor 103, which generates a wrong TA signal in response thereto. The wrong TA signal is supplied to the branch resolution logic 121, which accesses the conditional branch storage 119 to determine the appropriate BA/BR addresses. Alternately, the appropriate BA/BR addresses may be part of the wrong TA signal supplied by the processor 103. The branch resolution logic 121 then utilizes the BA/BR addresses to insert and store the correct TA address into the appropriate entry of the BHT 109 or MHT 111.

The branch resolution logic 121 also functions to detect and correct taken/not taken prediction errors. Typically, after a branch instruction has completed execution by the processor 103, the resolution status (taken/not taken) of the branch instruction is supplied to the branch resolution logic 121. If the resolution status indicates the branch was not taken, the branch resolution logic 121 searches the conditional branch storage 119 for a BA/BR pair that matches the full address of the resolved branch instruction. Because the conditional branch storage 119 stores only predicted taken branches, if the matching branch address is found, the branch resolution logic detects a prediction error and deletes the corresponding entry in the BHT 109 or MHT 111. Deleting the entry may be accomplished, for example, by setting the valid bit of the entry to not valid. If the resolution status indicates the branch was taken, the branch resolution logic 121 searches the conditional branch storage 119 for a BA/BR pair that matches the full address of the resolved branch instruction. If the matching full address is not found, the branch resolution logic detects a prediction error and adds a new entry to the BHT 109 or MHT 111. Adding the new entry may be accomplished by entering the entry into an empty position, by displacing the least recently used entry, or by other similar replacement algorithms. A more detailed description of updating the BHT 109 and/or MHT 111 may be found in U.S. Pat. No. 4,679,141 to Pomerene et al., incorporated by reference above.

Moreover, for system level instructions, branch conditions (which determine whether a particular branch is taken) are typically set by the instruction that immediately preceded the branch. In this case, effective prefetching of instructions requires that a prediction be made well before the condition is actually evaluated. However, for millicode routines, many of the millicode branch conditions are set by previous system level instructions, or are uniquely determined by the invocation of the specific millicode routine. Simply put, many of the millicode branch conditions remain static throughout the invocation of the millicode routine. Consequently, a good percentage of the millicode branch predictions are not predictions at all—the branch outcome can be determined with certainty at the time the MHT 111 is accessed.

To take advantage of static conditions upon which many millicode branch instructions depend, as shown in FIG. 2, the instruction decoder 302 of the processor 103 may include circuitry that generates static condition data pertaining to the system level instruction being decoded. The static condition data typically includes a plurality of bits $SC_N, \ldots, SC_3, SC_2, SC_1, SC_0$ each associated with a particular static condition. The binary value of each bit indicates the status of the associated static condition. Typically, a binary value of 1 indicates the associated static condition has been satisfied, and a binary value of 0 indicates the associated static condition has not been satisfied.

Figure 7:
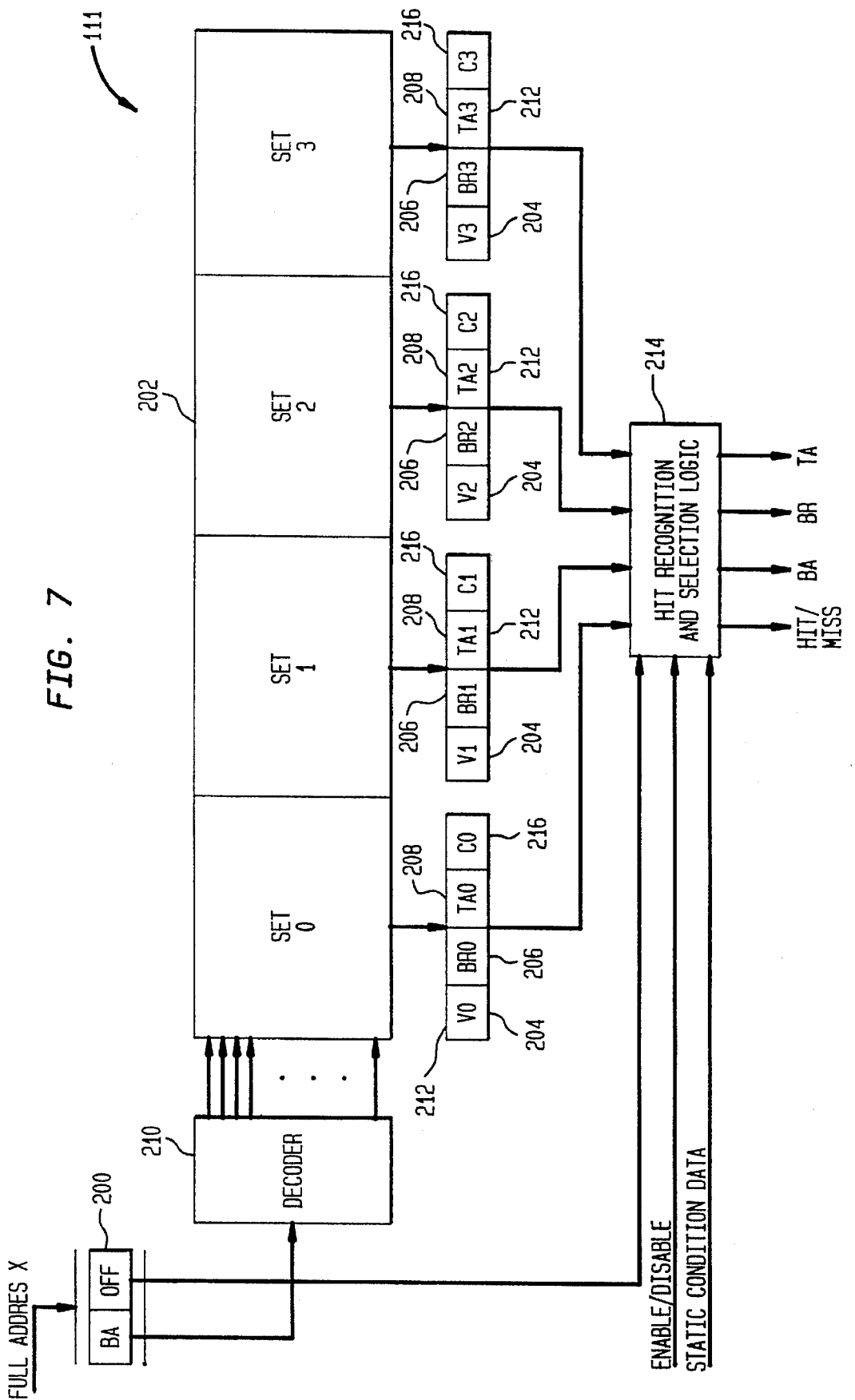
FIG. 7 is a diagram of a hardware implementation of the millicode branch history table of FIG. 1.
Figure 8:
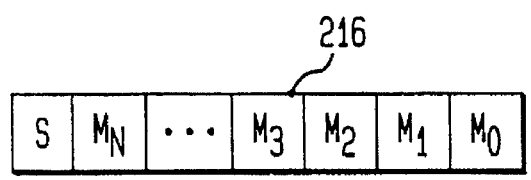
FIG. 8 is a diagram of the condition field of entries stored in the array of FIG. 7.

The static condition data is supplied to the hit recognition and selection logic 214 of the MHT 111 of FIG. 7. In addition, each entry of the array 202 of the MHT 111 includes a condition field 216. As shown in FIG. 8, the condition field 216 may include a bit S and a condition code mask M. The bit S indicates whether the millicode branch instruction is dependent upon static condition data. The condition code mask M includes a plurality of bits $M_K, \ldots, M_3, M_2, M_1, M_0$ that correspond to all or a subset of the bits $SC_N \ldots, SC_3, SC_2, SC_1, SC_0$ of the static condition data. The binary value of each bit of the condition code mask M indicates if the corresponding bit of the static condition data is relevant in determining the outcome of the millicode branch instruction defined by the specific entry in the array 202. Typically, a binary value of 1 indicates the corresponding bit of the static condition data is relevant, and a binary value of 0 indicates the corresponding bit of the static condition data is not relevant.

In general, the hit recognition and selection logic 214 operates as follows. The bit S of the condition field 216 of the entries loaded into the storage elements 212 is compared with a predetermined value to determine if one or more of the entries is a millicode branch instruction dependent upon static conditions (commonly indicated by bit S having a binary value of 1), and the bits of static condition data corresponding to the condition code mask M of a valid entry are evaluated to determine if the identified static conditions are satisfied. This may be accomplished by comparing the condition code mask M of the valid entry to the corresponding bits of the static condition data. If the appropriate static conditions are satisfied, the hit recognition and selection logic outputs a "hit" signal, the block address BA and branch address BR that identifies the full address of the branch instruction, and the target address TA of the branch instruction. If the appropriate static conditions are not satisfied, the hit recognition and selection logic outputs a "miss" signal. The "hit" signal controls the multiplexer 115 to load the target address TA into the I-fetch address register 113. The "miss" signal controls the multiplexer 115 to load the next sequential block address (generated by next sequential block address generation logic 117) into the I-FETCH address register 113.

Note that more than one millicode branch instruction that depends upon static conditions may occur with a block. In this case, the hit resolution and prediction logic 214 includes additional logic to pick one of the millicode branch instructions, for example, the branch instruction whose branch address tag 206 is nearest to the offset OFF of the accessed instruction.

If bit S of the condition field 216 of each of the entries loaded into the storage elements 212 indicates that a millicode branch instruction dependent upon static conditions does not exist, the hit resolution and selection logic 214 may operate as described above to determine if a conditional branch instruction is located within the accessed block. In the alternative, the hit resolution and selection logic 214 may utilize the static condition data in addition to or in place of the valid bit to locate a predicted taken conditional branch instruction.

Figure 9:
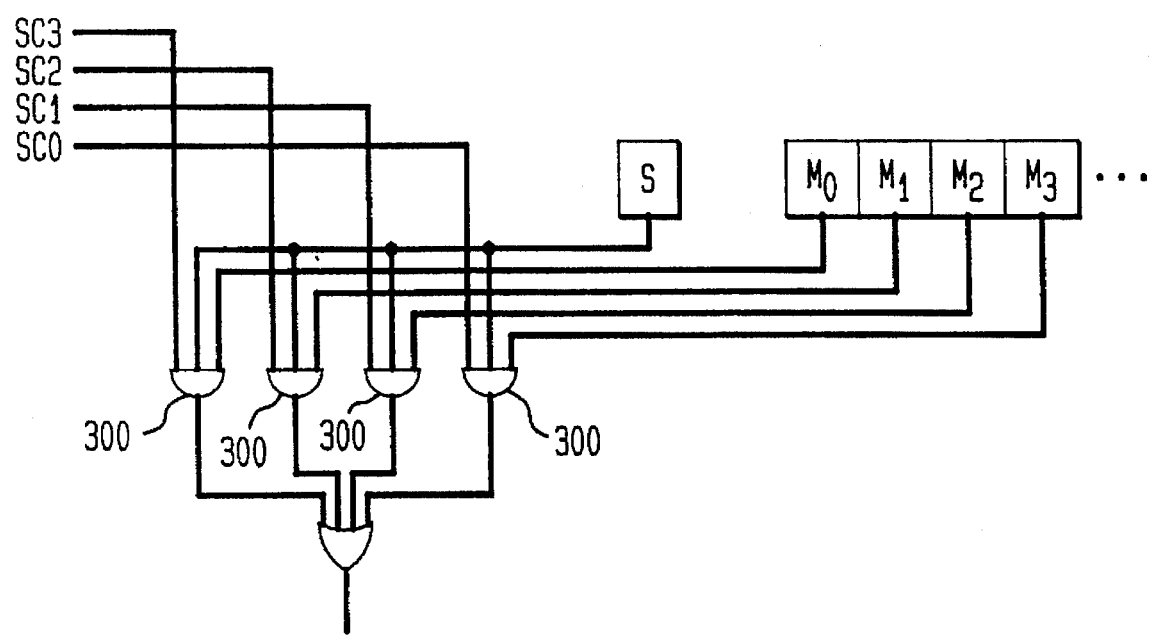
FIG. 9 is a functional diagram of logic that is part of the hit recognition and selection logic of FIG. 7.

FIG. 9 illustrates a functional block diagram of the logic that may be utilized to determine if the bit S of the condition field 216 of an entry corresponds to a millicode branch instruction dependent upon static conditions, and to evaluate the appropriate bits of static condition data. The bit S and condition code mask M of the condition field of the entry are stored in a register. For purposes of illustration, it is assigned that Bit S having a binary value of 1 indicates that the corresponding entry is a branch instruction that depends upon static condition data, and bit S having a binary value of 0 indicates that the corresponding entry is not a branch instruction that depends upon static condition data. It is also assigned that the bits of the condition code mask M having a binary value of 1 indicate the corresponding static control data bit is relevant, and the bits of the condition code mask M having a binary value of 0 indicate the corresponding static data control bit is irrelevant. Furthermore, it is assigned that a static control bit having a binary value of 1 indicates the static condition is satisfied, and a static control bit having a binary value of 0 indicates the static condition is not satisfied.

Each of the bits of the condition code mask (for example, $M_0, M_1, M_2, M_3$ as shown) together with the corresponding bit of the static control data (for example, $SC_0, SC_1, SC_2, SC_3$ as shown) and the S bit, are applied as inputs to AND gates 300. The output of the AND gates 300 are applied to an OR gate 302 to produce at output signal that identifies when an entry within the accessed block is a taken millicode branch instruction that depends upon static conditions.

Note that because millicode branch instructions depending upon static conditions are not conditional during the execution of the millicode routine (but are determined with certainty), the conditional branch storage 119 need not store these branch instructions to update and correct the MHT 111 as described above. In this case, when the MHT 111 locates a taken branch instruction depending upon static conditions, the "hit" signal output from the MHT 111 disables the conditional branch storage 119.

Furthermore, the MHT 111 may be initialized during initial program load. Preferably, initialization is accomplished by loading the MHT 111 with all the millicode branch points and their corresponding target addresses. Branch point prediction of conditional branches may be initialized by setting the valid bit of frequently taken millicode branches to valid, and by setting the valid bit of infrequently taken branches to not valid. Branch point control of static branches may be initialized by setting the S bit and initializing the corresponding condition code mask. In this case, because the target addresses of each branch instruction are known at initial program load, the target address correction of the MHT 111 discussed above may be deactivated.

Moreover, because millicode branch instructions depending upon static conditions are not conditional during the execution of the millicode routine, it is possible to remove these static millicode branch instructions from the millicode array 107 and fold them into the MHT 111. The operation of the MHT 111 is modified slightly from that described above with respect to FIGS. 7–9.

For example, consider the instruction stream of the millicode routine of FIGS. 5 and 6 and assume the millicode branch instruction ω at address 0EF184 is a static millicode branch instruction. In this case, the MHT 111 is loaded with an entry as described above with respect to FIGS. 6–8 that corresponds to the instruction ω, yet instead of having a branch address tag 206 that identifies the address of the branch instruction ω as described above, the branch address tag 206 identifies the address of the instruction υ preceding the branch instruction ω.

More specifically, when the MHT 111 is accessed with the address of instruction υ, the decoder 210 activates the corresponding row of the array 202. Each entry of the activated row is read out of the array 202 into storage elements 212. The entries loaded into the storage elements 212 along with the second part OFF of the full address X of the instruction υ are supplied to hit recognition and selection logic 214. The hit recognition and selection logic 214 operates to determine if the following conditions are met: one of the entries loaded into the storage elements 212 has a branch address tag 206 that matches the offset OFF of the address of the instruction υ; such an entry is a static millicode branch instruction (commonly indicated by bit S having a binary value of 1); and the static conditions identified by the bits of static condition data corresponding to the condition code mask M of such an entry are satisfied. If these conditions are met, the hit recognition and selection logic outputs a "hit" signal and the target address TA (in this case, the address 0EF38C of instruction F) of the embedded static millicode branch instruction ω. If the conditions are not met, the hit recognition and selection logic outputs a "miss" signal. The "hit" signal controls the multiplexer 115 to load the target address TA into the I-fetch address register 113. The "miss" signal controls the multiplexer 115 to load the next sequential block address (generated by next sequential block address generation logic 117) into the I-FETCH address register 113.

Folding static millicode branch instructions into the MHT 111 is advantageous in two respects. First, because the static millicode instructions are removed from the millicode array, the size of the millicode array 107 is decreased. And second, the static millicode branch instructions are no longer executed by the processor 103, but executed by the MHT 111, thus conserving cycle time and improving performance of the system.

In another aspect, if the size of the MHT 111 required to hold all the millicode branch instructions is too large to be implemented in a desired cycle time, a pageable MHT 111 may be implemented. The pageable MHT is analogous to a pageable BHT, described in detail in U.S. Pat. No. 4,679,141 to Pomerene et al., which is incorporated by reference above.

Other embodiments of the invention will be apparent to those skilled in the art from consideration of the specification and practice of the invention disclosed herein. It is intended that the specification and examples be considered as examples only, with the true scope of the invention being indicated by the claims.

We claim:

1. In a computer processing system having memory mapped into at least a first and second region, said first region storing instructions belonging to a first instruction set architecture of said computer processing system and said second region storing instructions belonging to a second instruction set architecture of said computer processing system, wherein said first instruction set architecture includes at least one instruction that does not belong to said second instruction set architecture, wherein said at least one instruction belonging to said first instruction set architecture is implemented by a plurality of instructions belonging to said second instruction set architecture, and wherein said instructions belonging to said first instruction set architecture comprise at least one branch type instruction and said instructions belonging to said second instruction set architecture comprise at least one branch type instruction, a method of fetching instructions from said first and second regions of memory into an instruction buffer for execution by a processor unit, the method comprising the steps of:

in a first mode, fetching instructions belonging to said first instruction set architecture from said first region of memory into said instruction buffer according to data stored in a first branch history table associated with instructions belonging to said first instruction set architecture; and in a second mode, fetching instructions belonging to said second instruction set architecture from said second region of memory into said instruction buffer according to data stored in a second branch history table associated with instructions belonging to said second instruction set architecture;

wherein said second branch history table is separate from said first branch history table.

2. The method of claim 1, wherein in said second mode, the step of fetching instructions belonging to said second instruction set architecture from said second region of memory into said instruction buffer is controlled according to static condition data generated in said first mode and said data stored in said second branch history table.

3. The method of claim 1, further comprising the steps of:

initializing said computer processing system to operate in said first mode; and switching operation of said computer processing system to said second mode upon said processor unit detecting that an instruction being executed is defined by one or more of said instructions stored in said second region of memory.

4. The method of claim 3, further comprising the step of:

switching operation of said computer processing system back to said first mode upon detecting that an instruction being executed is a predetermined instruction belonging to said second instruction set architecture.

5. The method of claim 1, wherein addresses of instructions belonging to said second set architecture instruction stored in said second memory are predetermined, and wherein at least one branch type instruction belonging to said second instruction set architecture is removed from said second memory and folded into said second branch history table.

6. The method of claim 5, wherein all branch type instructions belonging to said second set architecture instruction are removed from said second memory and folded into said second branch history table.

7. The method of claim 5, wherein said branch type instructions belonging to said second set architecture instruction are classified as one of a first category of branch type instructions and a second category of branch type instructions, wherein said first category of branch type instructions are removed from said second memory and folded into said second branch history table.

8. The method of claim 7, wherein said first category of branch type instructions belonging to said second instruction set architecture are branch type instructions that depend upon static condition data generated in said first mode.

9. The method of claim 8, wherein said second instruction set architecture comprise millicode instructions.

10. The method of claim 5, wherein said second branch history table comprises at least one entry corresponding to said at least one branch type instruction belonging to said second instruction set architecture that is removed from said second memory and folded into said second branch history table, said entry including an address tag, a target address and a condition field, wherein when said second branch history table is accessed with an instruction address matching said address tag, said second branch history table outputs signals to control fetching of one or more instructions located at said target address within said second memory if conditions defined by said condition field are satisfied.

11. The method of claim 1, wherein said first instruction set architecture comprise system level instructions and said second instruction set architecture comprise millicode instructions.

12. The method of claim 11, wherein one or more of said millicode instructions define a complex system level instruction.

13. The method of claim 11, wherein said millicode instructions emulate a third instruction set architecture.

14. The method of claim 1, wherein said second branch history table associated with said second instruction set architecture comprises an array of entries each corresponding to a branch type instruction stored in said second region of memory.

15. The method of claim 14, wherein said entries are initialized at initial program load.

16. The method of claim 14, further comprising the step of:

generating static condition data in said first mode, wherein in said second mode, the step of fetching instructions belonging to said second instruction set architecture from said second region of memory into said instruction buffer is controlled according to said static condition data and said data stored in a second branch history table.

17. A computer processing system comprising:

a memory mapped into at least a first and second region, said first region storing instructions belonging to a first instruction set architecture, and said second region storing instructions belonging to a second instruction set architecture of said computer unit, wherein said first instruction set architecture includes at least one instruction that does not belong to said second instruction set architecture, wherein said at least one instruction belonging to said first instruction set architecture is implemented by a plurality of instructions belonging to said second instruction set architecture, and wherein said instructions belonging to said first instruction set architecture comprise at least one branch type instruction and said instructions belonging to said second instruction set architecture comprise at least one branch type instruction;

an instruction buffer, coupled to said memory, for storing instructions that are executed by a processor unit;

means for fetching instructions belonging to said first instruction set architecture from said first region of memory into said instruction buffer according to data stored in a first branch history table associated with instructions belonging to said first instruction set architecture in a first mode; and means for fetching instructions belonging to said second instruction set architecture from said second region of memory into said instruction buffer according to data stored in a second branch history table associated with instructions belonging to said second instruction set architecture in a second mode;

wherein said second branch history table is separate from said first branch history table.

18. The computer processing system of claim 17, wherein said means for fetching instructions belonging to said second instruction set architecture from said second region of memory into said instruction buffer is controlled according to static condition data generated in said first mode and said data stored in said second branch history table.

19. The computer processing system of claim 17, wherein said computer system is initialized to operate in said first mode, further comprising logic that switches operation to said second mode upon detecting that an instruction being executed by said processor unit is defined by one or more of said instructions stored in said second memory.

20. The computer processing system of claim 19, further comprising logic that switches operation of said computer processing system back to said first mode upon detecting that an instruction being executed by said processor unit is a predetermined instruction belonging to said second set of instructions.

21. The computer processing system of claim 17, wherein addresses of instructions belonging to said second instruction set architecture stored in said second memory are predetermined, and wherein at least one branch type instruction belonging to said second instruction set architecture is removed from said second memory and folded into said second branch history table.

22. The computer processing system of claim 21, wherein all branch type instructions belonging to said second instructure set architecture are removed from said second memory and folded into said second branch history table.

23. The computer processing system of claim 21, wherein said branch type instructions belonging to said second instructure set architecture are classified as one of a first category of branch type instructions and a second category of branch type instructions, wherein said first category of branch type instructions are removed from said second memory and folded into said second branch history table.

24. The computer processing system of claim 23, wherein said first category of branch type instructions belonging to said second instructure set architecture are branch type instructions that depend upon static condition data generated in said first mode.

25. The computer processing system of claim 24, wherein said second instruction set architecture comprise millicode instructions.

26. The computer processing system of claim 21, wherein said second branch history table comprises at least one entry corresponding to said at least one branch type instruction belonging to said second instructure set architecture that is removed from said second memory and folded into said second branch history table, said entry including an address tag, a target address and a condition field, wherein when said second branch history table is accessed with an instruction address matching said address tag, said second branch history table outputs signals to control fetching of one or more instructions located at said target address within said second memory if conditions defined by said condition field are satisfied.

27. The computer processing system of claim 17, wherein said first instruction set comprise system level instructions and said second instructure set architecture comprise millicode instructions.

28. The computer processing system of claim 27, wherein one or more of said millicode instructions define a complex system level instruction.

29. The computer processing system of claim 27, wherein said millicode instructions emulate a third instruction set architecture.

30. The computer processing system of claim 17, wherein said second branch history table associated with said second instruction set architecture comprises an array of entries each corresponding to a branch type instruction stored in said second region of memory.

31. The computer processing system of claim 30, wherein said entries are initialized at initial program load.

32. The computer processing system of claim 30, further comprising:

an instruction decoder, coupled to said instruction buffer, that generates static condition data in said first mode, wherein said second branch history table associated with said second set of instructions further comprises logic that outputs signals to control fetching of instructions located at one of a target address and a next sequential address within said second memory according to said static condition data.

33. A computer processing unit comprising:

a memory mapped into at least a first and second regions, said first region storing instructions belonging to a first instruction set architecture of said computer processing unit, and said second region storing instructions belonging to a second instruction set architecture of said computer processing system, wherein said first instruction set architecture includes at least one instruction that does not belong to said second instruction set architecture, wherein said at least one instruction belonging to said first instruction set architecture is implemented by a plurality of instructions belonging to said second instruction set architecture, and wherein said instructions belonging to said first instruction set architecture comprise at least one branch type instruction and said instructions belonging to said second instruction set architecture comprise at least one branch type instruction;

an instruction buffer, coupled to said memory, for storing instructions that are executed by a processor unit;

an instruction address register for storing an address of at least one instruction fetched from said memory into said instruction buffer;

a first branch history table that, in a first mode, controls a multiplexer to load one of a target address and a next sequential address of an instruction belonging to said first instruction set architecture into said instruction address register in a second fetching cycle according to said address stored in said instruction address register in a first fetching cycle, wherein said second fetching cycle is subsequent to said first fetching cycle; and a second branch history table that, in a second mode, controls said multiplexer to load one of a target address and a next sequential address of an instruction belonging to said second instruction set architecture into said instruction address register in a fourth fetching cycle according to said address stored in said instruction address register in a third fetching cycle, wherein said fourth fetching cycle is subsequent to said third fetching cycle;

wherein said second branch history table is separate from said first branch history table.

34. The computer processing unit of claim 33, further comprising:

an instruction decoder, coupled to said instruction buffer, that generates static condition data in said first mode, wherein said second branch history table comprises logic that evaluates said static condition data to determine whether to control said multiplexer to load one of said target address and said next sequential address.

35. The computer processing unit of claim 33, wherein said first instruction set architecture comprise system level instructions and said second instruction set architecture comprise millicode instructions.

36. The computer processing unit of claim 35, wherein addresses of said millicode instructions stored in said second memory are predetermined, and wherein at least one branch type millicode instruction is removed from said second memory and folded into said second table.

37. The computer processing unit of claim 36, wherein all branch type millicode instructions are removed from said second memory and folded into said second table.

38. The computer processing unit of claim 36, wherein said branch type millicode instructions are classified as one of a first category of branch type millicode instructions and a second category of branch type millicode instructions, wherein said first category of branch type millicode instructions are removed from said second memory and folded into said second table.

39. The computer processing unit of claim 36, wherein said first category of branch type millicode instructions are branch type instructions that depend upon static condition data generated in said first mode.

40. The computer processing unit of claim 36, wherein said second table comprises at least one entry corresponding to at least one branch type millicode instruction that is removed from said second memory and folded into said second table, said entry including an address tag, a target address and a condition field, wherein when said second table is accessed with an instruction address matching said address tag, said second table outputs signals to control fetching of one or more instructions located at said target address within said second memory if conditions defined by said condition field are satisfied.

* * * * *